(12) United States Patent
Tanno

(10) Patent No.: US 11,214,101 B2
(45) Date of Patent: Jan. 4, 2022

(54) PNEUMATIC TIRE

(71) Applicant: The Yokohama Rubber Co., LTD., Tokyo (JP)

(72) Inventor: Atsushi Tanno, Hiratsuka (JP)

(73) Assignee: The Yokohama Rubber Co., Ltd.

( * ) Notice: Subject to any disclaimer, the term of this patent is extended or adjusted under 35 U.S.C. 154(b) by 412 days.

(21) Appl. No.: 15/038,348

(22) PCT Filed: Nov. 21, 2014

(86) PCT No.: PCT/JP2014/080946
§ 371 (c)(1),
(2) Date: May 20, 2016

(87) PCT Pub. No.: WO2015/076380
PCT Pub. Date: May 28, 2015

(65) Prior Publication Data
US 2016/0288588 A1 Oct. 6, 2016

(30) Foreign Application Priority Data
Nov. 21, 2013 (JP) .............................. JP2013-241357

(51) Int. Cl.
*B60C 19/00* (2006.01)
*B60C 1/00* (2006.01)
(Continued)

(52) U.S. Cl.
CPC ........ *B60C 19/002* (2013.01); *B29D 30/0061* (2013.01); *B32B 3/085* (2013.01);
(Continued)

(58) Field of Classification Search
CPC .......... B29D 30/0061; B32B 2307/102; B32B 2307/536; B32B 2307/54; B32B 2433/00;
(Continued)

(56) References Cited

U.S. PATENT DOCUMENTS

2005/0098251 A1 5/2005 Rubber
2005/0155686 A1 7/2005 Naoki et al.
(Continued)

FOREIGN PATENT DOCUMENTS

JP    2002-067608    3/2002
JP    2005-138760    6/2005
(Continued)

OTHER PUBLICATIONS

JP2006044503A—Machine Translation (Year: 2006).*
International Search Report for International Application No. PCT/JP2014/080946 dated Feb. 10, 2015, 4 pages, Japan.

*Primary Examiner* — Matthew J Daniels
*Assistant Examiner* — Yunju Kim
(74) *Attorney, Agent, or Firm* — Thorpe North & Western

(57) ABSTRACT

A pneumatic tire according to the present technology is a pneumatic tire provided with a tread section, sidewall sections, and bead sections, a belt-shaped sound-absorbing member being bonded via an adhesive layer to an inner surface of the tire in a region corresponding to the tread section along the circumferential direction of the tire, wherein a bonding surface of the sound-absorbing member is provided with a bonded region that is bonded to the inner surface of the tire and an unbonded region that is not bonded to the inner surface of the tire, and the bonded region is divided by the unbonded region into a plurality of divisions along the circumferential direction of the tire.

15 Claims, 6 Drawing Sheets

(51) Int. Cl.
  *B60C 11/00* (2006.01)
  *B60C 13/00* (2006.01)
  *B60C 15/00* (2006.01)
  *B29D 30/00* (2006.01)
  *B32B 3/08* (2006.01)
  *B60C 5/00* (2006.01)
  *B32B 3/28* (2006.01)
  *B32B 5/18* (2006.01)
  *B32B 7/12* (2006.01)

(52) U.S. Cl.
  CPC ............... *B32B 3/28* (2013.01); *B32B 5/18* (2013.01); *B32B 7/12* (2013.01); *B60C 1/00* (2013.01); *B60C 5/00* (2013.01); *B60C 11/00* (2013.01); *B60C 13/00* (2013.01); *B60C 15/00* (2013.01); *B32B 2307/102* (2013.01); *B32B 2307/536* (2013.01); *B32B 2307/54* (2013.01); *B32B 2433/00* (2013.01); *B32B 2605/08* (2013.01)

(58) Field of Classification Search
  CPC ....... B32B 2605/08; B32B 3/085; B32B 3/28; B32B 5/18; B32B 7/12; B60C 11/00; B60C 13/00; B60C 15/00; B60C 19/002; B60C 1/00; B60C 5/00
  USPC .................................................. 152/157, 450
  See application file for complete search history.

(56) References Cited

U.S. PATENT DOCUMENTS

| | | | |
|---|---|---|---|
| 2009/0277549 | A1 | 11/2009 | Rubber |
| 2011/0061781 | A1* | 3/2011 | Tanno ................... B60C 19/002 152/450 |

FOREIGN PATENT DOCUMENTS

| | | |
|---|---|---|
| JP | 2006-044503 | 2/2006 |
| JP | 2009-292462 | 12/2009 |
| JP | 2010-173573 | 8/2010 |
| WO | WO 2003/103989 | 12/2003 |

* cited by examiner

PNEUMATIC TIRE

TECHNICAL FIELD

The present technology relates to a pneumatic tire comprising a belt-shaped sound-absorbing member bonded to an inner surface of the tire in a region corresponding to a tread section, and, more specifically, to a pneumatic tire that allows for the mitigation of shear strain occurring on a bonding surface of the sound-absorbing member and the suppression of peeling of the sound-absorbing member.

BACKGROUND ART

In pneumatic tires, cavity resonance caused by the vibration of air filling the tire is one cause of noise production. When a tire is rolled, uneven road surfaces cause a tread section to vibrate. The vibrations of the tread section cause the air inside the tire to vibrate, which produces cavity resonance.

One proposed method for reducing the noise produced by this phenomenon of cavity resonance is to provide a sound-absorbing member within the cavity formed between the tire and the rim of the wheel. More specifically, a belt-shaped sound-absorbing member is bonded to the inner surface of the tire in a region corresponding to the tread section (see, for example, Japanese Unexamined Patent Application Publication Nos. 2002-67608A and 2005-138760A).

However, pneumatic tires exhibit radial growth caused by swelling during inflation or centrifugal force when traveling at high speeds, this radial growth generates shear strain in the bonding surface of the sound-absorbing member. In addition, the tread section deforms when in contact with the ground; this deformation is also a factor leading to the generation of shear strain in the bonding surface of the sound-absorbing member. When the bonding surface of sound-absorbing member bonded to the inner surface of the tire is subjected to repetitive shear strain over extended periods of time, the problem of peeling of the sound-absorbing member from the inner surface of the tire occurs.

SUMMARY

The present technology provides a pneumatic tire comprising a belt-shaped sound-absorbing member bonded to the inner surface of the tire in a region corresponding to a tread section, wherein it is possible to mitigate shear strain generated in the bonding surface of the sound-absorbing member and suppress peeling of the sound-absorbing member.

A pneumatic tire according to the present technology is a pneumatic tire provided with a ring-shaped tread section that extends in a circumferential direction of the tire, a pair of side wall sections disposed on both sides of the tread section, and a pair of bead sections disposed to the inside of the side wall sections with respect to a radial direction of the tire, a belt-shaped sound-absorbing member being bonded via an adhesive layer to an inner surface of the tire in a region corresponding to the tread section along the circumferential direction of the tire, the tire being characterized in that a bonding surface of the sound-absorbing member is provided with a bonded region in which the sound-absorbing member is bonded to the inner surface of the tire and an unbonded region in which the sound-absorbing member is not bonded to the inner surface of the tire, and the bonded region is divided by the unbonded region into a plurality of divisions along the circumferential direction of the tire.

The present technology provides a pneumatic tire comprising a belt-shaped sound-absorbing member bonded via an adhesive layer to the inner surface of the tire in a region corresponding to the tread section along the circumferential direction of the tire, wherein a bonding surface of the sound-absorbing member is provided with a bonded region and an unbonded region, and the bonded region is divided by the unbonded region into a plurality of divisions along the circumferential direction of the tire, making it possible to mitigate shear strain generated in the bonding surface of the sound-absorbing member by radial growth due to inflation-induced swelling or centrifugal force when traveling at high speed or by deformation of the tread section when in contact with the ground, and to suppress peeling of the sound-absorbing member. As a result, the noise-reducing effects of the sound-absorbing member can be maintained over extended periods of time.

In the present technology, the unbonded region preferably has a shape that overlaps with an imaginary straight line orthogonal to the circumferential direction of the tire along the entire width of the sound-absorbing member. In other words, it is preferable that the unbonded region extend primarily in the tire widthwise direction. This allows for effective mitigation of shear strain generated in the bonding surface of the sound-absorbing member.

It is also preferable that, in addition to the bonded region being divided by the unbonded region into a plurality of divisions along the circumferential direction of the tire, the bonded region be divided by the unbonded region into a plurality of divisions along the widthwise direction of the tire. This allows for the effective mitigation of shear strain in the widthwise direction of the tire in addition to shear strain in the circumferential direction of the tire.

It is preferable that the sound-absorbing member be constituted by a single sound-absorbing member extending in the circumferential direction of the tire, the single sound-absorbing member being of uniform thickness at least within a range corresponding to the bonding surface of the sound-absorbing member as seen in a cross-section orthogonal to a lengthwise direction thereof, and having a constant cross-sectional shape along the lengthwise direction. This allows the volume of sound-absorbing member per unit of bonded area to be maximized, thereby yielding superior noise-reducing effects. In addition, a sound-absorbing member having such a shape is easy to machine, thereby reducing manufacturing costs.

It is preferable that the volume of sound-absorbing member be more than 20% of the volume of the cavity formed within the tire when the tire is mounted on a rim. Increasing the volume of the sound-absorbing member in this way allows superior noise-reducing effects to be obtained, and allows a satisfactory bonded state to be maintained over long periods of time even when a large sound-absorbing member is used. The term "volume of the cavity" refers to the volume of the cavity formed between the tire and the rim when the tire is mounted on a regular rim and inflated to a regular internal pressure. A "regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). If the tire is for installation on a new vehicle, the volume of the cavity is calculated using the genuine wheel upon which the tire is mounted. "Regular internal pressure" is the air pressure defined by standards for each tire according to a system of standards that includes standards on which tires are based, and refers to "maximum air pressure" in the case of JATMA, to the maximum value in the table of "TIRE ROAD LIMITS AT VARIOUS COLD INFLATION PRESSURES" in the case of TRA, and to "INFLATION PRESSURE" in the case of ETRTO. In the case of a tire for installation upon a new vehicle, the air pressure displayed on the vehicle is used.

It is preferable that the sound-absorbing member have a hardness of 60 to 170 N, and a tensile strength of 60 to 180 kPa. Sound-absorbing member having such physical properties exhibits superior durability against shear strain. The hardness of the sound-absorbing member is as measured according to Japanese Industrial Standard JIS-K 6400-2, "Flexible cellular polymeric materials—Physical properties—Part 2: Determination of hardness and stress-strain characteristics in compression", method D (method for calculating strength after constant 25% compression for 20 seconds). The tensile strength of the sound-absorbing member is as measured according to JIS-K 6400-5, "Flexible cellular polymeric materials—Physical properties—Part 5: Determination of tensile strength, elongation at break and tear strength".

It is preferable that the sound-absorbing member comprise a cut-out section at least one location along the circumferential direction of the tire. The provision of a cut-out section of this sort allows for effective mitigation of shear strain generated in the bonding surface of the sound-absorbing member.

When disposing alternating cut-out sections and unbonded regions at intervals around the circumferential direction of the tire, it is preferable that, defining n as the total number of cut-out sections and unbonded regions, a reference angle α as 360°/n, and a tolerance angle β as 90°/n, the angle θ at which the cut-out sections and the unbonded regions are actually disposed satisfy the relationship α−β≤θ≤α+β. This allows for effective mitigation of shear strain generated in the bonding surface of the sound-absorbing member.

It is preferable that the adhesive layer be constituted by double-sided adhesive tape having a peeling adhesive strength in a range of 8 to 40 N/20 mm. This facilitates the processes of bonding the sound-absorbing member and removing the sound-absorbing member when the tire is being disposed of while maintaining satisfactory anchoring strength on the part of the sound-absorbing member. The peeling adhesive strength of the double-sided adhesive tape is as measured according to JIS-Z 0237. Specifically, a double-sided adhesive sheet is bonded to a piece of PET film having a thickness of 25 μm to create a backing. The adhesive sheet with backing is cut to a 20 mm×200 mm square to create a test sample. The peeling liner is peeled off the test sample, and the exposed adhesive surface is bonded to a piece of stainless steel (SUS: B304; surface finish: BA) acting as an adherend by rolling a 2 kg roller up and down thereon. This arrangement is kept in a 23° C., 50% relative humidity environment for 30 minutes, after which a tensile tester is used to measure the peeling adhesive strength at 180° of the adhesive sheet to the SUS sheet according to JIS-Z 0237 and 23° C., the 50% relative humidity environment at testing conditions of 180° peeling angle and a tensile speed of 300 m/m.

DETAILED DESCRIPTION

Figure 1:
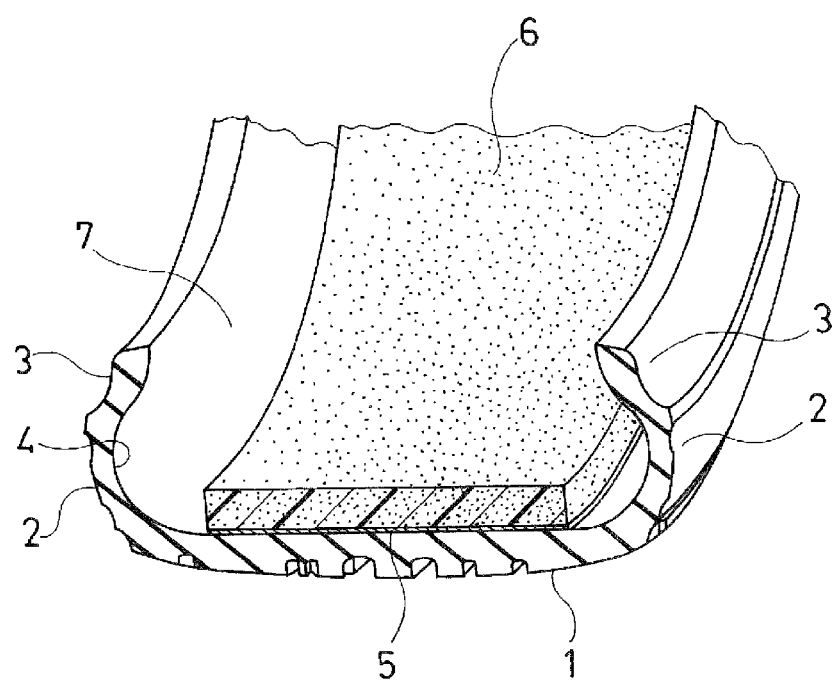
FIG. 1 is a perspective cross-sectional view illustrating a pneumatic tire according to an embodiment of the present technology.
Figure 2:
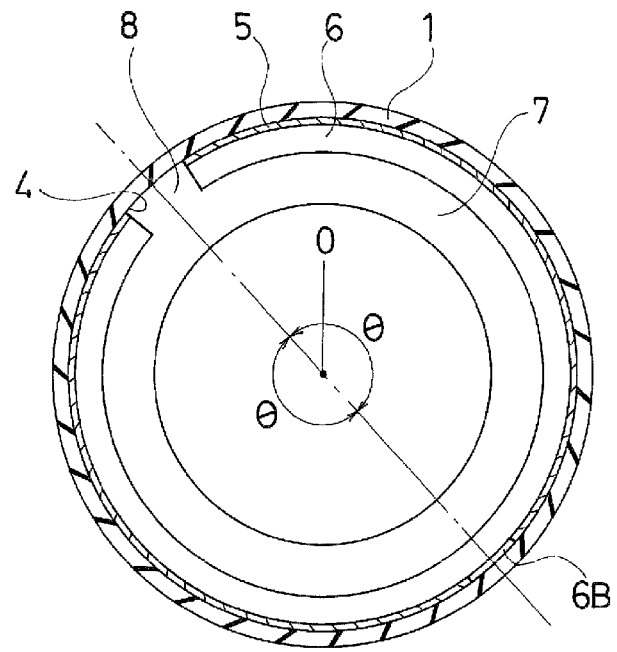
FIG. 2 is an equatorial cross-sectional view illustrating a pneumatic tire according to an embodiment of the present technology.

A detailed description of the configuration of the present technology is given below, with reference to the accompanying drawings. FIGS. 1 and 2 illustrate a pneumatic tire according to an embodiment of the present technology. In FIG. 1, a pneumatic tire according to the present embodiment is provided with a ring-shaped tread section 1 that extends in the tire circumferential direction, a pair of side wall sections 2 disposed on both sides of the tread section 1, and a pair of bead sections 3 disposed to the inside of the side wall sections 2 with respect to the radial direction of the tire.

In the pneumatic tire described above, a belt-shaped sound-absorbing member 6 is bonded via an adhesive layer 5 to the tire inner surface 4 in a region corresponding to the tread section 1 along the circumferential direction of the tire. The sound-absorbing member 6 is constituted by a porous material comprising open cells, and has specific sound-absorbing characteristics based on its porous structure. Polyurethane foam is preferably used as the porous material constituting the sound-absorbing member 6. Meanwhile, a paste-like adhesive or double-sided adhesive tape can be used for the adhesive layer 5.

Figure 3:
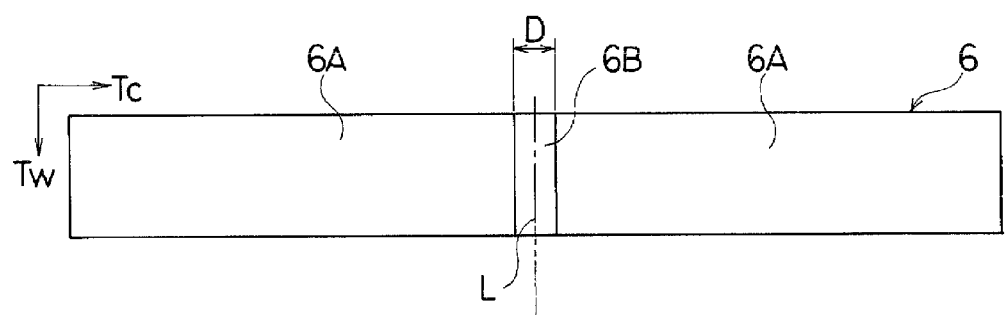
FIG. 3 is a developed view illustrating an example of sound-absorbing member bonded to an inner surface of a pneumatic tire according to the present technology.

FIG. 3 illustrates an example of sound-absorbing member 6 bonded to an inner surface of a pneumatic tire according to the present technology. In FIG. 3, Tc is the circumferential direction of the tire, and Tw is the widthwise direction of the tire. As illustrated in FIG. 3, bonded regions 6A that are bonded to the tire inner surface 4 and unbonded regions 6B that are not bonded to the tire inner surface 4 are provided on a bonding surface of the sound-absorbing member 6 (i.e., the outer surface thereof with respect to the radial direction of the tire). The unbonded regions 6B are regions in which the sound-absorbing member 6 is not bonded to the tire inner surface 4, and may be constituted by regions in which the adhesive layer 5 has been locally removed, or by regions in which, for example, the adhesive force of the adhesive layer 5 has been locally deactivated after the adhesive layer 5 has been provided over the entire bonding surface of the sound-absorbing member 6. The unbonded regions 6B cut across the entire width of the sound-absorbing member 6 at intermediate positions along the lengthwise direction of the sound-absorbing member 6. As a result, the bonded region 6A is divided by the unbonded regions 6B into a plurality of divisions along the circumferential direction of the tire.

In the pneumatic tire described above, the belt-shaped sound-absorbing member 6 is bonded via the adhesive layer 5 to the inner surface 4 of the tire in a region corresponding to the tread section 1 along the circumferential direction of the tire, the bonding surface of the sound-absorbing member 6 is provided with a bonded region 6A and an unbonded region 6B, and the bonded region 6A is divided by the unbonded region 6B into a plurality of divisions along the circumferential direction of the tire, making it possible to mitigate shear strain generated in the bonding surface of the sound-absorbing member by radial growth due to inflation-induced swelling or centrifugal force when traveling at high speed or by deformation of the tread section when in contact with the ground. Specifically, shear strain caused by changes in the circumferential length of the tread section 1 increase when the length of the bonded region 6A along the circumferential direction of the tire increases; however, dividing the bonded region 6A by the unbonded region 6B into a plurality of divisions along the circumferential direction of the tire allows this shear strain to be reduced. As a result, it is possible to suppress peeling of the sound-absorbing member 6 and maintain the noise-reducing effects of the sound-absorbing member 6 over extended periods of time.

It is necessary that an unbonded region 6B be provided at at least one location in the sound-absorbing member 6; it is also acceptable to provide unbonded regions at multiple locations along the lengthwise direction of the sound-absorbing member 6. The distance D along the tire circumferential direction between divisions of the bonded region 6A divided by the unbonded regions 6B is preferably set in a range of 10 to 80 mm. If the distance D is less than 10 mm, shear-strain-mitigating effects will be reduced; conversely, if the distance exceeds 80 mm, the sound-absorbing member 6 will move easily, which is a factor negatively affecting the durability thereof.

Figure 4:
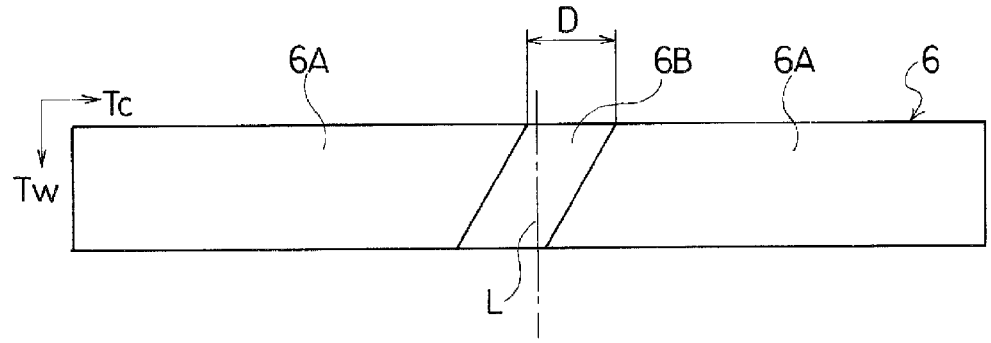
FIG. 4 is a developed view illustrating a modified example of sound-absorbing member bonded to an inner surface of a pneumatic tire according to the present technology.

FIG. 4 illustrates a modified example of sound-absorbing member 6 bonded to an inner surface of a pneumatic tire according to the present technology. Unlike the example illustrated in FIG. 3, in which the unbonded region 6B has a rectangular shape as seen in plan view, the unbonded region 6B in the example illustrated in FIG. 4 has a parallelogram shape as seen in plan view. In both cases, the unbonded region 6B has a shape that overlaps an imaginary straight line L that is orthogonal to the circumferential direction Tc along the entire width of the sound-absorbing member 6. In other words, the unbonded region 6B extends in the tire widthwise direction Tw to cut across the sound-absorbing member 6. This allows for effective mitigation of shear strain generated in the bonding surface of the sound-absorbing member 6. It is especially preferable to adopt a rectangular or parallelogram shape that satisfies the requirement regarding the imaginary straight line L.

Figure 5:
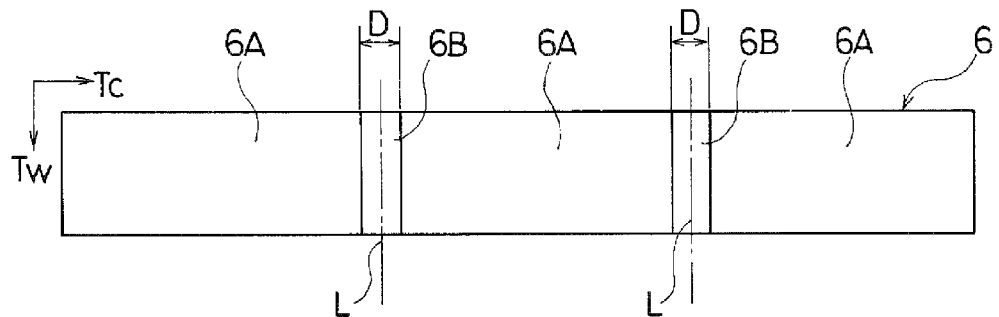
FIG. 5 is a developed view illustrating another modified example of sound-absorbing member bonded to an inner surface of a pneumatic tire according to the present technology.

FIG. 5 illustrates another modified example of sound-absorbing member 6 bonded to an inner surface of a pneumatic tire according to the present technology. In FIG. 5, unbonded regions 6B are provided at two locations along the lengthwise direction of the sound-absorbing member 6. It is of course acceptable to increase the number of unbonded regions 6B provided in the sound-absorbing member 6.

Figure 6:
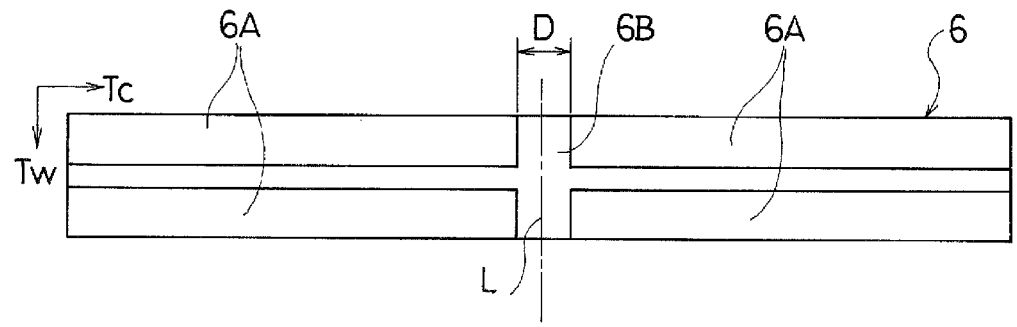
FIG. 6 is a developed view illustrating another modified example of sound-absorbing member bonded to an inner surface of a pneumatic tire according to the present technology.
Figure 7:
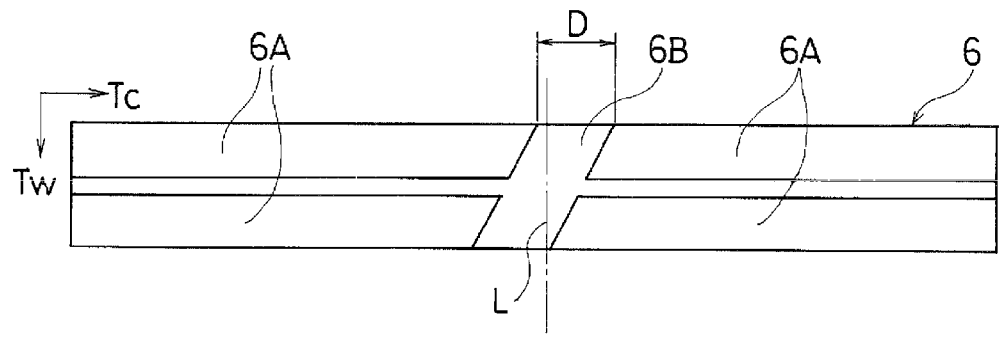
FIG. 7 is a developed view illustrating another modified example of sound-absorbing member bonded to an inner surface of a pneumatic tire according to the present technology.

FIGS. 6 and 7 illustrate other modified examples of sound-absorbing member 6 bonded to an inner surface of a pneumatic tire according to the present technology. In FIGS. 6 and 7, unbonded regions 6B having cross-like shapes are formed in the bonding surface of the sound-absorbing member 6. Specifically, the unbonded region 6B cuts across the entire width of the sound-absorbing member 6 at an intermediate position along the lengthwise direction of the sound-absorbing member 6, and across the entire length of the sound-absorbing member 6 at an intermediate position along the widthwise direction of the sound-absorbing member 6. As a result, the bonded region 6A is divided by the unbonded region 6B into a plurality of divisions along the circumferential direction of the tire, and by the unbonded region 6B into a plurality of divisions along the widthwise direction of the tire. This allows for the effective mitigation of shear strain in the widthwise direction of the tire in addition to shear strain in the circumferential direction of the tire.

In the pneumatic tire described above, it is preferable that a single sound-absorbing member 6 extend in the circumferential direction of the tire, the sound-absorbing member 6 being of uniform thickness at least within a range corresponding to the bonding surface of the sound-absorbing member as seen in a cross-section orthogonal to the lengthwise direction thereof, and having a constant cross-sectional shape along its lengthwise direction. In particular, it is preferable that the sound-absorbing member 6 have a rectangular (including square) cross-sectional shape in a cross-section orthogonal to the lengthwise direction thereof; however, in some cases, an inverted trapezoid shape in which the bonding surface side is narrower in width may also be possible. This allows the volume of sound-absorbing member 6 per unit of bonded area to be maximized, thereby yielding superior noise-reducing effects. In addition, a sound-absorbing member 6 having such a shape is easy to machine, thereby reducing manufacturing costs.

When the pneumatic tire described above is mounted on a rim, a cavity 7 is formed between the entire inner surface 4 and the rim; the volume of the sound-absorbing member 6 is preferably more than 20% of the volume of the cavity 7. Increasing the volume of the sound-absorbing member 6 in this way allows superior noise-reducing effects to be obtained, and allows a satisfactory bonded state to be maintained over long periods of time even when a large sound-absorbing member 6 is used. The width of the sound-absorbing member 6 is preferably in a range of 30 to 90% of the tire ground contact width.

It is preferable that the sound-absorbing member 6 have a hardness (DIS-K 6400-2) of 60 to 170 N, and a tensile strength (JIS-K 6400-5) of 60 to 180 kPa. Sound-absorbing member 6 having such physical properties will exhibit superior durability against shear strain. If the hardness or tensile strength of the sound-absorbing member 6 is too low, the durability of the sound-absorbing member 6 will be reduced. In particular, the hardness of the sound-absorbing member 6 is preferably from 70 to 160 N, more preferably from 80 to 140 N. The tensile strength of the sound-absorbing member 6 is preferably from 75 to 165 kPa, more preferably from 90 to 150 kPa.

It is preferable that the sound-absorbing member 6 comprise a cut-out section 8 at least one location along the circumferential direction of the tire, as illustrated in FIG. 2. The cut-out section 8 is a section in which the sound-absorbing member 6 is not present along the circumference of the tire. In addition to the provision of an unbonded region 6B in the bonding surface of the sound-absorbing member 6, the provision of the sound-absorbing member 6 with a cut-out section 8 of this sort allows for effective mitigation of shear strain generated in the bonding surface of the sound-absorbing member 6. It is preferable that a cut-out section 8 of this sort be provided at one location or at 3 to 5 locations around the circumference of the tire. Specifically, providing cut-out sections 8 at two locations around the circumference of the tire causes a dramatic degradation in tire uniformity due to unbalanced mass, and providing cut-out sections 8 at six or more locations around the circumference of the tire leads to dramatic increases in manufacturing costs.

Providing cut-out sections 8 at two or more locations around the circumference of the tire causes the sound-absorbing member 6 to be discontinuous along the circumferential direction of the tire; however, even in such cases, the individual sound-absorbing members 6 can be handled as a single intact member by, for example, connecting the multiple sound-absorbing members 6 to each other using another laminate such as an adhesive layer 5 of double-sided adhesive tape, thereby facilitating the process of bonding the sound-absorbing member 6 to the inner surface of the tire.

Figure 8:
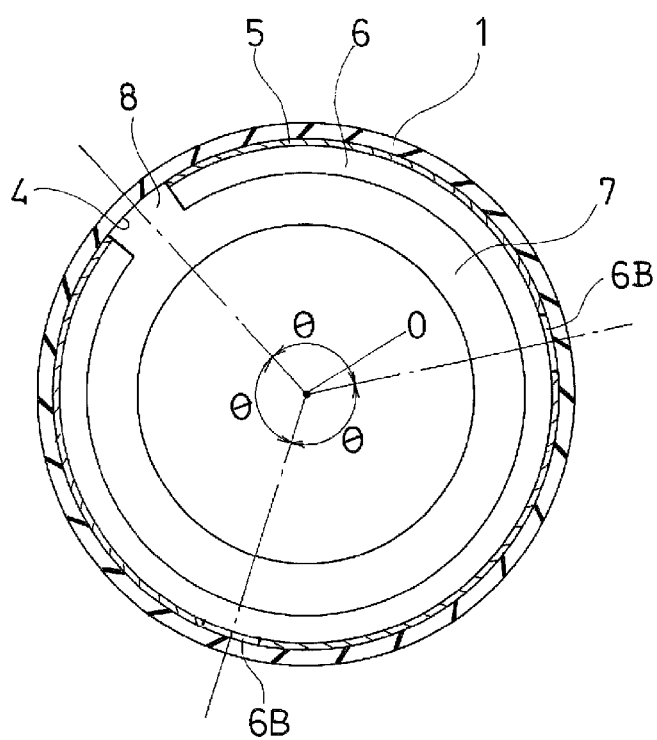
FIG. 8 is an equatorial cross-sectional view illustrating a pneumatic tire according to another embodiment of the present technology.
Figure 9:
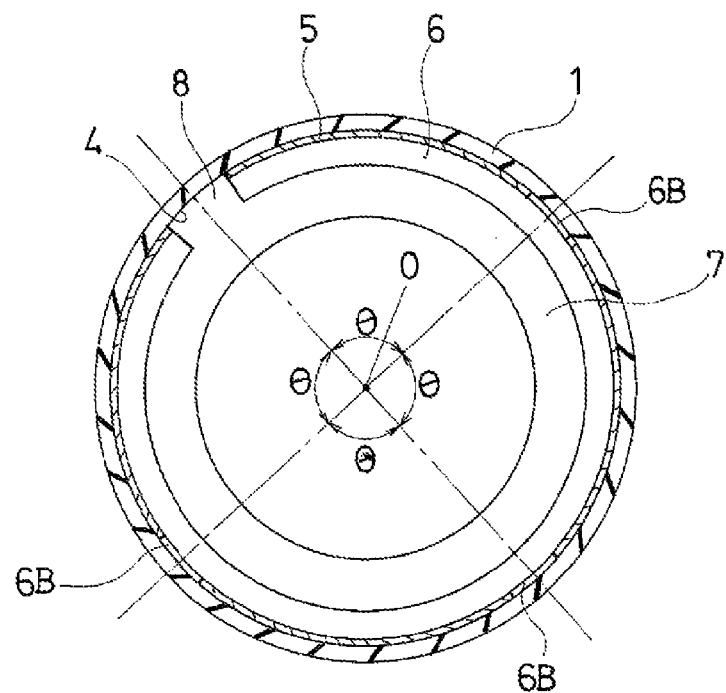
FIG. 9 is an equatorial cross-sectional view illustrating a pneumatic tire according to another embodiment of the present technology.
Figure 10:
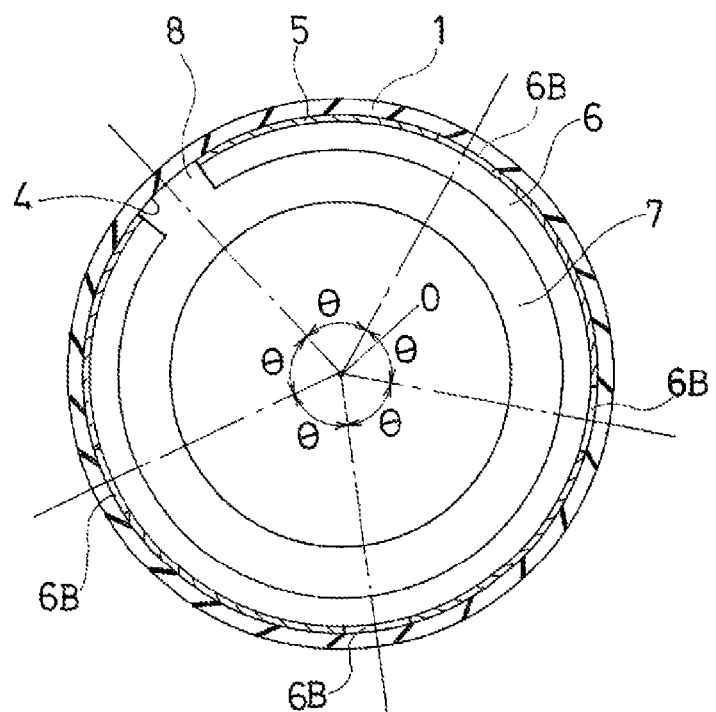
FIG. 10 is an equatorial cross-sectional view illustrating a pneumatic tire according to another embodiment of the present technology.

FIGS. 8 through 12 illustrate pneumatic tires according to other embodiments of the present technology. Whereas FIG. 2 illustrates an embodiment in which an unbonded region 6B is provided at one location along the lengthwise direction of the sound-absorbing member 6, FIG. 8 illustrates an embodiment in which unbonded regions 6B are provided at two locations along the lengthwise direction of the sound-absorbing member 6, FIG. 9 illustrates an embodiment in which unbonded regions 6B are provided at three locations along the lengthwise direction of the sound-absorbing member 6, and FIG. 10 illustrates an embodiment in which unbonded regions 6B are provided at four locations along the lengthwise direction of the sound-absorbing member 6. It is especially preferable to provide unbonded regions 6B at one to three locations along the lengthwise direction of the sound-absorbing member 6. This allows for a balance between shear-strain-mitigating effects and suppression of manufacturing costs.

Figure 11:
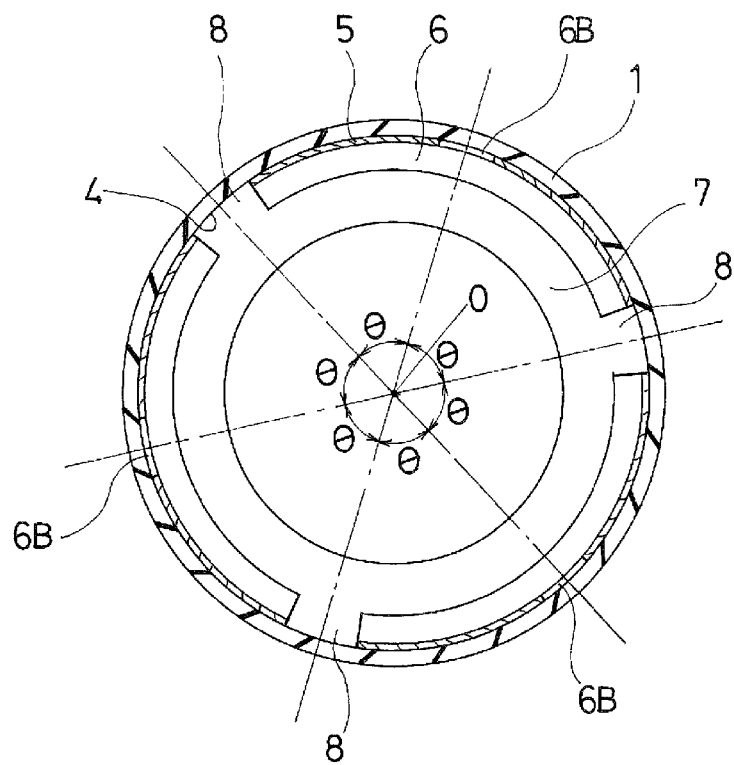
FIG. 11 is an equatorial cross-sectional view illustrating a pneumatic tire according to another embodiment of the present technology.
Figure 12:
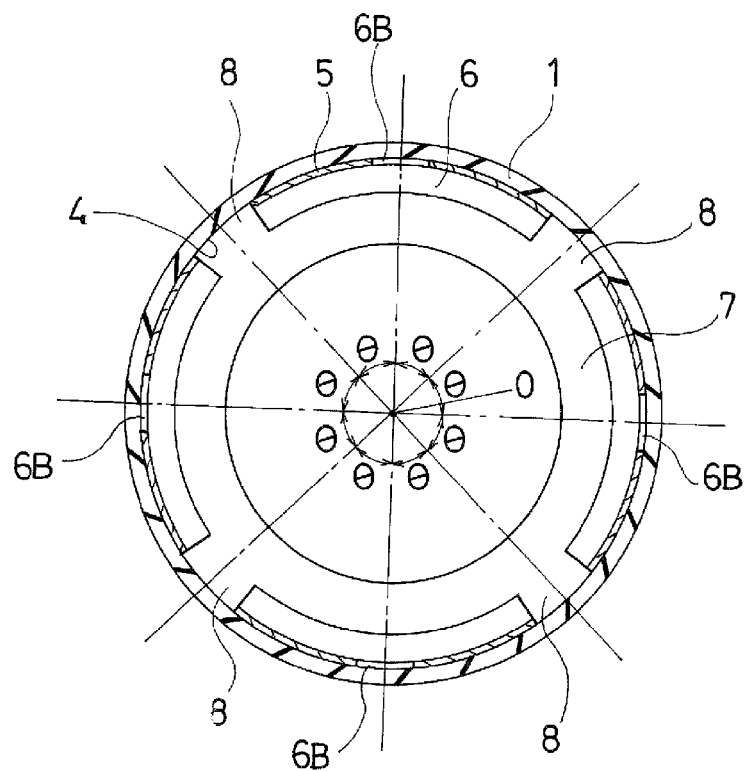
FIG. 12 is an equatorial cross-sectional view illustrating a pneumatic tire according to another embodiment of the present technology.

In the embodiment illustrated in FIG. 11, cut-out sections 8 are provided at three locations around the circumference of the tire, and an unbonded region 6B is provided at one location along the lengthwise direction of each of the sound-absorbing members 6. In the embodiment illustrated in FIG. 12, cut-out sections 8 are provided at four locations around the circumference of the tire, and an unbonded region 6B is provided at one location along the lengthwise direction of each of the sound-absorbing members 6. In the various embodiments described above, when disposing alternating cut-out sections 8 and unbonded regions 6B at intervals around the circumferential direction of the tire, it is preferable that, defining n as the total number of cut-out sections 8 and unbonded regions 6B, a reference angle $\alpha$ as $360°/n$, and a tolerance angle $\beta$ as $90°/n$, the angle $\theta$ at which the cut-out sections 8 and the unbonded regions 6B are actually disposed satisfy the relationship $\alpha - \beta \leq \theta \leq \alpha + \beta$. For example, $\theta = 180° \pm 45°$ in the embodiment illustrated in FIG. 2, $\theta = 120° \pm 30°$ in the embodiment illustrated in FIG. 8, $\theta = 90° \pm 22.5°$ in the embodiment illustrated in FIG. 9, $\theta = 72° \pm 18°$ in the embodiment illustrated in FIG. 10, $\theta = 60° \pm 15°$ in the embodiment illustrated in FIG. 11, and $\theta = 45° \pm 11.25°$ in the embodiment illustrated in FIG. 12. By disposing cut-out sections 8 and unbonded regions 6B at substantially equal intervals around the circumference of the tire, it is possible to effectively mitigate shear strain generated in the bonding surface of the sound-absorbing member 6. The angle $\theta$ at which the cut-out sections 8 and the unbonded regions 6B are disposed is an angle as measured around the rotational axis O of the tire, and serves as a reference angle for the central positions of the cut-out sections 8 and unbonded regions 6B in the circumferential direction of the tire.

It is preferable that the adhesive layer 5 have a peeling adhesive strength (JIS-Z 0237:2009) in a range of 8 to 40 N/20 mm. This facilitates the processes of bonding the sound-absorbing member 6 and removing the sound-absorbing member when the tire is being disposed of while maintaining satisfactory anchoring strength on the part of the sound-absorbing member 6. Specifically, if the peel strength of the adhesive layer 5 is too low, the anchoring state of the sound-absorbing member 6 will become unstable; conversely, if the peel strength of the adhesive layer 5 is too great, it will be difficult to alter the bonding position during the process of bonding the sound-absorbing member 6, and to remove the sound-absorbing member 6 when disposing of the tire. In particular, the peeling adhesive strength of the adhesive layer 5 is preferably from 9 to 30 N/20 mm, more preferably 10 to 25 N/20 mm.

The pneumatic tire described above comprises tire component members such as a carcass layer and an inner liner layer; these tire component members comprise spliced sections extending in the widthwise direction of the tire that are formed by splicing the tire circumferential directional ends of belt-shaped members to each other. If such tire constituent members are present, the spliced sections thereof are preferably disposed in the unbonded region 6B of the sound-absorbing member 6. More specifically, the spliced sections are preferably disposed along the imaginary straight lines L as illustrated in FIGS. 3 to 7. If double-sided adhesive tape in particular is used to bond the sound-absorbing member 6 to the inner surface 4 of the tire, the double-sided adhesive tape may fail to conform to the difference in height at the spliced sections during this process, causing localized sections of unbonded tape. Such a localized bonding defects may gradually expand as the tread section deforms when the tire is traveling, with the result that the sound-absorbing member 6 eventually falls off. By contrast, by disposing the spliced sections of the tire constituent members typified by the carcass layer and the inner liner layer in the unbonded region 6B of the sound-absorbing member 6, it is possible to avoid such inconveniences and ensure a durable bond on the part of the sound-absorbing member 6.

EXAMPLES

Tires according to a Comparative Example 1 and Working Examples 1 to 3 constituted by size 215/45R17 pneumatic tires provided with a ring-shaped tread section that extends in a circumferential direction of the tire, a pair of side wall sections disposed on both sides of the tread section, and a pair of bead sections disposed to the inside of the side wall sections with respect to a radial direction of the tire, a belt-shaped sound-absorbing member being bonded via an adhesive layer to an inner surface of the tire in a region corresponding to the tread section along the circumferential direction of the tire were prepared, with the sound-absorbing member being bonded in different manners in the various tires.

In Comparative Example 1, a cut-out section was provided at one location in the belt-shaped sound-absorbing member along the circumferential direction of the tire, and the entire bonding surface of the sound-absorbing member constituted a bonded region.

In Working Example 1, a cut-out section was provided in the belt-shaped sound-absorbing member at one location along the circumferential direction of the tire, and, as illustrated in FIG. 2, a bonded region and an unbonded region were provided on the bonding surface of the sound-absorbing member, and the bonded region was divided by the unbonded region into two divisions along the circumferential direction of the tire. The angle θ at which the cut-out section and the unbonded region was disposed was 180°. The unbonded region had a rectangular shape as seen in plan view, as illustrated in FIG. 3.

In Working Example 2, a cut-out section was provided in the belt-shaped sound-absorbing member at one location along the circumferential direction of the tire, and, as illustrated in FIG. 2, a bonded region and an unbonded region were provided on the bonding surface of the sound-absorbing member, and the bonded region was divided by the unbonded region into two divisions along the circumferential direction of the tire. The angle θ at which the cut-out section and the unbonded region was disposed was 180°. The unbonded region had a cross-like shape as seen in plan view, as illustrated in FIG. 6, and the bonded region was divided by the unbonded region into two divisions along the widthwise direction of the tire.

In Working Example 3, a cut-out section was provided in the belt-shaped sound-absorbing member at one location along the circumferential direction of the tire, and, as illustrated in FIG. 8, a bonded region and an unbonded region were provided on the bonding surface of the sound-absorbing member, and the bonded region was divided by the unbonded region into three divisions along the circumferential direction of the tire. The angle θ at which the cut-out section and the unbonded region were disposed was 120°. The unbonded region had a rectangular shape as seen in plan view, as illustrated in FIG. 5.

Comparative Example 1 and Working Examples 1 to 3 shared the following features. The sound-absorbing member had a rectangular cross-sectional shape as seen in a cross-section orthogonal to the lengthwise direction thereof, and the cross-sectional shape was constant along the tire circumferential direction. The volume of the sound-absorbing member was 30% of the volume of the cavity formed within the tire when mounted on a rim. The sound-absorbing member had a hardness of 80 N and a tensile strength of 90 kPa. The adhesive layer had a peeling adhesive strength of 16 N/20 mm.

The pneumatic tires according to Comparative Example 1 and Working Examples 1 to 3 were mounted on wheels having rim sizes of 17×7 JJ, and subjected to a 100-hour running test on a drum tester at an air pressure of 150 kPa, a load of 5 kN, and a speed of 150 km/h, after which the presence or lack of peeling of the sound-absorbing member was visually confirmed. In order to obtain an index of peeling resistance, a running test was performed using a drum tester under similar conditions, the presence or lack of sound-absorbing member peeling was confirmed every 10 hours, and the running distance until peeling occurred was measured. Peeling resistance evaluation results were expressed as index vales, Comparative Example 1 being assigned an index value of 100. Larger index values indicate superior peeling resistance. Results are shown in table 1.

TABLE 1

|  | Comparative Example 1 | Working Example 1 | Working Example 2 | Working Example 3 |
| --- | --- | --- | --- | --- |
| Unbonded region present? | No | Yes | Yes | Yes |
| Disposition of unbonded region along circumferential direction | — | FIG. 2 | FIG. 2 | FIG. 8 |
| Plan-view shape of unbonded region | — | FIG. 3 | FIG. 6 | FIG. 5 |
| Angle θ at which cut-out section(s) and unbonded region(s) are disposed | — | 180 | 180 | 120 |
| Peeling of sound-absorbing member present? | Yes | No | No | No |
| Peeling resistance | 100 | 120 | 130 | 130 |

As shown in table 1, the tire of Comparative Example 1 exhibited dramatic peeling of the sound-absorbing member following the 100-hour running test, whereas absolutely no peeling of the sound-absorbing member was observed after the 100-hour running test in the tires of Working Examples 1 to 3.

Next, tires according to Working Examples 4 to 11 having structures identical to that of Working Example 1 or 3, except for having different sound-absorbing member hardnesses, sound-absorbing member tensile strengths, adhesive layer peeling adhesive strengths, and cut-out section/unbonded region disposition angles θ, were prepared.

The tires according to Working Examples 4 to 11 were evaluated for the presence or lack of sound-absorbing member peeling and peeling resistance following a 100-hour running test according to methods similar to those described above. Results are shown in table 2.

TABLE 2

|  | Working Example 4 | Working Example 5 | Working Example 6 | Working Example 7 | Working Example 8 | Working Example 9 | Working Example 10 | Working Example 11 |
|---|---|---|---|---|---|---|---|---|
| Unbonded region present? | Yes | Yes | Yes | Yes | Yes | Yes | Yes | Yes |
| Disposition of unbonded region along circumferential direction | FIG. 2 | FIG. 2 | FIG. 2 | FIG. 2 | FIG. 2 | FIG. 2 | FIG. 8 | FIG. 8 |
| Plan-view shape of unbonded region | FIG. 3 | FIG. 3 | FIG. 3 | FIG. 3 | FIG. 3 | FIG. 3 | FIG. 5 | FIG. 5 |
| Sound-absorbing member hardness (N) | 60 | 170 | 80 | 80 | 80 | 80 | 80 | 80 |
| Sound-absorbing member tensile strength (kPa) | 60 | 180 | 90 | 90 | 90 | 90 | 90 | 90 |
| Adhesive layer peeling adhesive strength (N/20 mm) | 16 | 16 | 8 | 40 | 16 | 16 | 16 | 16 |
| Angle θ at which cut-out section(s) and unbonded region(s) are disposed | 180 | 180 | 180 | 180 | 135, 225 | 120, 240 | 90, 120, 150 | 70, 120, 170 |
| Peeling of sound-absorbing member present? | No | No | No | No | No | No | No | No |
| Peeling resistance | 120 | 120 | 110 | 140 | 130 | 120 | 150 | 140 |

As shown in table 2, the tires of Working Examples 4 to 7, which had different sound-absorbing member hardnesses, sound-absorbing member tensile strengths, and adhesive layer peeling adhesive strengths, exhibited no peeling of the sound-absorbing member whatsoever after 100 hours of running, as in the case of Working Examples 1 and 3. In addition, as is clear from a comparison of Working Example 8 and Working Example 9 and a comparison of Working Example 10 and Working Example 11, defining n as the total number of cut-out sections and unbonded regions, a reference angle α as 360°/n, and a tolerance angle β as 90°/n, satisfactory effects were yielded when the angle θ at which the cut-out sections and unbonded regions were actually disposed satisfied the relationship $\alpha-\beta \leq \theta \leq \alpha+\beta$.

The invention claimed is:

1. A pneumatic tire provided with a ring-shaped tread section that extends in a circumferential direction of the tire, a pair of side wall sections disposed on both sides of the tread section, and a pair of bead sections disposed to the inside of the side wall sections with respect to a radial direction of the tire, a belt-shaped sound-absorbing member being bonded via an adhesive layer to an inner surface of the tire in a region corresponding to the tread section along the circumferential direction of the tire, the tire being characterized in that
 a bonding surface of the sound-absorbing member is provided with a bonded region in which the sound-absorbing member is bonded to the inner surface of the tire and at least one unbonded region in which the sound-absorbing member is not bonded to the inner surface of the tire, and the bonded region is divided by the at least one unbonded region into a plurality of divisions along the circumferential direction of the tire, wherein the bonding surface of the sound absorbing member is in contact with the inner surface of the tire at the at least one unbonded region and wherein a profile of the at least one unbonded region and the bonded region of the bonding surface matches a profile of an inner surface of the sound-absorbing member opposite the bonding surface; wherein:
 a volume of the sound-absorbing member is more than 20% of a volume of a cavity formed within the tire when the tire is mounted on a rim;
 the sound-absorbing member comprises at least one cut-out section in at least one location along the circumferential direction of the tire; and
 the at least one cut-out section and the at least one unbonded region are disposed at intervals around the circumferential direction of the tire, and, defining n as a total number of cut-out sections and unbonded regions, a reference angle α as 360°/n, and a tolerance angle β as 90°/n, an angle θ at which the at least one cut-out section and the at least one unbonded region are disposed satisfies a relationship $\alpha-\beta \geq \theta \geq \alpha+\beta$.

2. The pneumatic tire according to claim 1, wherein the at least one unbonded region has a shape that overlaps an imaginary straight line orthogonal to the circumferential direction of the tire along an entire width of the sound-absorbing member.

3. The pneumatic tire according to claim 2, wherein the bonded region is divided by the at least one unbonded region into a plurality of divisions along a widthwise direction of the tire.

4. The pneumatic tire according to claim 3, wherein the sound-absorbing member is constituted by a single sound-absorbing member extending in the circumferential direction of the tire, the sound-absorbing member being of uniform thickness at least within a range corresponding to the bonding surface of the sound-absorbing member as seen in a cross-section orthogonal to a lengthwise direction thereof, and having a constant cross-sectional shape along the lengthwise direction.

5. The pneumatic tire according to claim 1, wherein the bonded region is divided by the at least one unbonded region into a plurality of divisions along a widthwise direction of the tire.

6. The pneumatic tire according to claim 1, wherein the sound-absorbing member is constituted by a single sound-absorbing member extending in the circumferential direction of the tire, the sound-absorbing member being of uniform thickness at least within a range corresponding to the bonding surface of the sound-absorbing member as seen in a cross-section orthogonal to a lengthwise direction thereof, and having a constant cross-sectional shape along the lengthwise direction.

7. The pneumatic tire according to claim 1, wherein the sound-absorbing member has a hardness of 60 to 170 N, and a tensile strength of 60 to 180 kPa.

8. The pneumatic tire according to claim 7, wherein the adhesive layer is constituted by double-sided adhesive tape, and has a peeling adhesive strength in a range of 8 to 40 N/20 mm.

9. The pneumatic tire according to claim 8, wherein the sound-absorbing member is constituted by a porous material containing open cells.

10. The pneumatic tire according to claim 9, wherein the porous material is polyurethane foam.

11. The pneumatic tire according to claim 1, wherein the adhesive layer is constituted by double-sided adhesive tape, and has a peeling adhesive strength in a range of 8 to 40 N/20 mm.

12. The pneumatic tire according to claim 1, wherein the sound-absorbing member is constituted by a porous material containing open cells.

13. The pneumatic tire according to claim 12, wherein the porous material is polyurethane foam.

14. The pneumatic tire according to claim 1, wherein a distance between divisions of the bonded regions by the at least one unbonded region is from 10 to 80 mm.

15. A pneumatic tire provided with a ring-shaped tread section that extends in a circumferential direction of the tire, a pair of side wall sections disposed on both sides of the tread section, and a pair of bead sections disposed to the inside of the side wall sections with respect to a radial direction of the tire, a belt-shaped sound-absorbing member being bonded via an adhesive layer to an inner surface of the tire in a region corresponding to the tread section along the circumferential direction of the tire, the tire being characterized in that a bonding surface of the sound-absorbing member is provided with a bonded region in which the sound-absorbing member is bonded to the inner surface of the tire and at least one unbonded region in which the sound-absorbing member is not bonded to the inner surface of the tire, and the bonded region is divided by the at least one unbonded region into a plurality of divisions along the circumferential direction of the tire, wherein the bonding surface of the sound absorbing member is in contact with the inner surface of the tire at the at least one unbonded region and wherein a profile of the at least one unbonded region and the bonded region of the bonding surface matches a profile of an inner surface of the sound-absorbing member opposite the bonding surface; wherein the sound-absorbing member comprises at least one cut-out section in at least one location along the circumferential direction of the tire; and at least one cut-out section and at least one unbonded region are disposed at intervals around the circumferential direction of the tire, and, defining n as a total number of cut-out sections and unbonded regions, a reference angle $\alpha$ as $360°/n$, and a tolerance angle $\beta$ as $90°/n$, an angle $\theta$ at which the at least one cut-out section and the at least unbonded region are disposed satisfies a relationship $\alpha - \beta \geq \theta \geq \alpha + \theta$.

* * * * *